United States Patent [19]

Jachmann et al.

[11] Patent Number: 5,187,251

[45] Date of Patent: Feb. 16, 1993

[54] CURABLE ORGANOPOLYSILOXANES HAVING EPOXY GROUPS, METHODS OF SYNTHESIZING THEM AND THEIR USE AS CURABLE COATING MATERIALS WITH ABHESIVE PROPERTIES

[75] Inventors: Jürgen Jachmann, Herne; Christian Weitemeyer, Essen; Dietmar Wewers, Bottrop, all of Fed. Rep. of Germany

[73] Assignee: Th. Goldschmidt AG, Essen, Fed. Rep. of Germany

[21] Appl. No.: 730,347

[22] Filed: Jul. 15, 1991

[30] Foreign Application Priority Data

Jul. 25, 1990 [DE] Fed. Rep. of Germany ....... 4023556

[51] Int. Cl.$^5$ .............................................. C08G 77/06
[52] U.S. Cl. ......................................... 528/15; 528/27; 528/29; 427/387; 427/389.7; 428/447; 428/429
[58] Field of Search .............................. 528/15, 27, 29; 427/387, 389.7; 428/447, 429

[56] References Cited

U.S. PATENT DOCUMENTS

| | | | |
|---|---|---|---|
| 4,310,469 | 1/1982 | Crivello | 260/446 |
| 4,313,988 | 2/1982 | Koshar et al. | 428/40 |
| 4,394,403 | 7/1983 | Smith | 427/42 |
| 4,639,321 | 1/1987 | Barrat et al. | 252/8.8 |
| 4,822,687 | 4/1989 | Kessel et al. | 528/15 |
| 4,959,404 | 9/1990 | Nakane et al. | 528/29 |

FOREIGN PATENT DOCUMENTS

| | | |
|---|---|---|
| 0334068 | 9/1989 | European Pat. Off. |
| 0355381 | 2/1990 | European Pat. Off. |
| 0391162 | 10/1990 | European Pat. Off. |

Primary Examiner—Melvyn I. Marquis
Attorney, Agent, or Firm—Anderson Kill Olick & Oshinsky

[57] ABSTRACT

Organopolysiloxanes are disclosed which contain, aside from methyl groups, alkyl groups with 1 to 20 carbon atoms, aryl groups or aralkyl groups, epoxy groups which are linked over Si—C bonds to silicon atoms of the polysiloxanes, and $R^3OH$ groups, $R^3$ being a divalent alkylene groups with 3 to 11 carbon atoms. The organopolysiloxanes have good compatibility with photoinitiators and adhesion and release properties which can be adjusted for the intended application by coordinating the long chain alkyl groups, the epoxy groups and the —$R^3OH$ groups.

14 Claims, No Drawings

CURABLE ORGANOPOLYSILOXANES HAVING EPOXY GROUPS, METHODS OF SYNTHESIZING THEM AND THEIR USE AS CURABLE COATING MATERIALS WITH ABHESIVE PROPERTIES

BACKGROUND OF THE INVENTION

This invention relates to curable organopolysiloxanes having epoxy groups. This invention also relates to a method for synthesizing these curable organopolysiloxanes having epoxy groups and to the use thereof as curable coating materials with abhesive properties, as casting compositions and as coating materials for glass fibers.

There is extensive patent literature which deals with curable epoxysiloxanes and their use as coating agents. Of the large number of patents, U.S. Pat. No. 4,313,988 is named initially. In this patent, a product is described which consists of a support tape with a pressure-sensitive adhesive. On one side of the tape, a layer of a normally adhering and pressure-sensitive adhesive is provided and on the other surface, a material with abhesive properties is disposed. This material consists of a curable epoxypolysiloxane either in solution or in 100% form, which corresponds to the formula

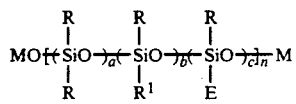

In this formula
R represents a low molecular weight alkyl group with 1 to 3 carbon atoms;
$R^1$ represents a monovalent hydrocarbon group with 4 to 20 carbon atoms;
E is a monovalent hydrocarbon group containing epoxy groups;
M is a silyl group having the formula $R_3Si-$; $R_2R^1Si-$ or $R_2ESi-$, R, $R^1$ and E being as defined above;
a has a value of 5 to 200;
b is 0 or has a value up to 20% that of a and a+b is 5 to 200;
c can assume the value 0 when M is the $R_2ESi$ group, or is larger than 0 but smaller than 20% of the value of a+b when M is the $R_3Si-$, $R_2R^1Si-$ or $R_2ESi-$ group and
n has a value of 1 to 75,
with the proviso that the monovalent hydrocarbon group E, which contains epoxy groups, contains at least one polymerizable epoxy group of the formula

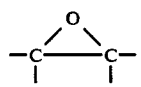

The rest of the E group consists of carbon and hydrogen atoms and is free of acetylenic unsaturations. In addition to the oxiran ether oxygen, a carbonyl oxygen or the

group can be present.

Also, the preparation can contain up to 98% by weight, based on epoxypolysiloxane, of an epoxysilane.

It is pointed out in the aforementioned U.S. Pat. No. 4,313,988 that, according to the state of the art, coatings with abhesive properties, that is, with release properties towards adhesives, are widely used. Dimethylpolysiloxanes provide coatings from which an adhesive tape can be pulled off with the low release force of 4 to 16 g/cm of tape width This measure indicates the force which must be employed to pull a 1 cm wide adhesive tape from the abhesively finished surface. If, however, adhesive tapes are to be produced, for example, in roll form and to be finished abhesively, this degree of abhesiveness is too high, since it leads to instabilities of the coiled roll. For such purposes, coatings are desired, the release forces of which, with respect to adhesive tapes, are selective and can be increased, for example to 60 to 350 g/cm and particularly to about 60 to 200 g/cm.

The epoxysiloxanes contain at least one polymerizable epoxy group of the formula

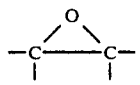

The following can be named as examples of such epoxy groups:

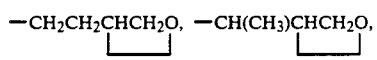

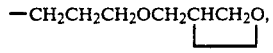

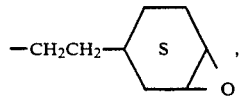

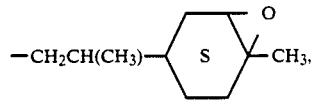

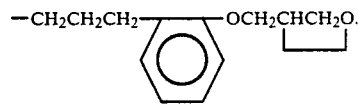

The epoxy groups preferably are located terminally at the hydrocarbon group.

Preferred epoxypolysiloxanes of U.S. Pat. No. 4,313,988 are those of the formula

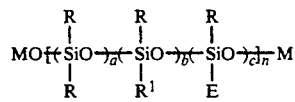

wherein R is a methyl group, b has a value of 0 and the E group is a β-(3,4-epoxycyclohexyl)ethyl or a γ-glycidoxypropyl group.

Curing of epoxypolysiloxanes or preparations which contain such epoxypolysiloxanes is accomplished by addition and in the presence of conventional epoxy curing catalysts. Examples of such catalysts are tertiary amines, Lewis acids, such as $BF_3$, and their complexes, such as those with ethers or amines, and polyaromatic iodonium and sulfonium complex salts, which contain $SbF_6$— or $BF_4$—anions as anions. Organic acids and their salts or derivatives can also be used as curing agents, such as perfluorinated sulfonic acids.

Suitable curing agents are also described in U.S. Pat. Nos. 4,394,403 and 4,310,469.

Very frequently, however, when adding the curing agent, it is observed that, depending on the structure of the preparation and particularly of the siloxanes, the miscibility and solubility of the photoinitiators (curing agents) are limited. Epoxy-functional siloxanes have already been modified in order to improve their compatibility with onium salt photoinitiators. For Example, in EP-A-0 334 068, epoxy-functional siloxanes are described, a portion of the epoxy groups of which was esterified by reaction with aromatic acids, such as benzoic acid, or unsaturated acids, such as acrylic acid. By these means, the compatibility of the epoxysiloxanes with the curing catalysts was increased. At the same time, however, the content of curable epoxy groups was decreased. Epoxy groups are reactive groups which can be activated to polymerize by weaker acids. This makes it exceedingly difficult to control the reaction. In the extreme case, the reaction can become uncontrolled and lead to gelling. Moreover, residual acid contents must be eliminated in order to ensure a long shelf life.

In European publication 0 335 381, an organopolysiloxane with modified release behavior and having the general $R_aR^1{}_bSiO_{(4-a-b)/2}$ is described. In this formula, R is a hydrogen group, an alkyl group with 1 to 8 carbon atoms or an aryl group. $R^1$ is a monovalent phenolic group with 6 to 26 carbon atoms; a is 0, 1 or 2; b is 1, 2 or 3 and a+b is 1, 2 or 3. The organopolysiloxane furthermore contains units of the formula $R_aR^2{}_cSiO_{(4-a-b)/2}$, in which R and a are defined as above. $R_2$ is a hydrogen group, a monovalent organofunctional acrylic group or a monovalent organofunctional epoxy group; c is 1, 2 or 3 and a+b is 1, 2 or 3. The release power of such a siloxane is modified by the amount of monovalent phenolic groups contained. The higher the content of phenolic groups, the lower are the release properties of the siloxane. However, as a result of the high acidity of the phenolic hydroxyl group, considerable problems arise with the synthesis and storage of these modified siloxanes. The epoxy groups can be activated to polymerize by the phenolic OH group and this leads to unwanted gelling and premature curing of the modified siloxanes.

SUMMARY OF THE INVENTION

It is an object of the invention to provide curable organopolysiloxanes which contain epoxy groups and have good compatibility with photoinitiators, without having the disadvantages mentioned above.

Another object of the invention is to provide modified epoxysiloxanes with improved adhesion to the substrate and, at the same time, to provide an opportunity for modifying the release properties in accordance with the application, that is, to adjust them for the purpose for which they are intended.

A further object of the invention is to provide a method for the synthesis of epoxypolysiloxanes having the desired characteristics.

Another important object of the invention is the provision of a method of using the organopolysiloxanes of the invention having epoxy groups, alone or in admixture with other compounds, as a curable coating material with adhesive properties, as a casting composition and as a casting material for glass fibers.

These and other objects of the invention are attained by the invention described below.

It has now been discovered that modified organopolysiloxanes which are built up in a particular manner and contain epoxy groups have the desired characteristics. Curable organopolysiloxanes of the invention which contain epoxy groups have the average formula

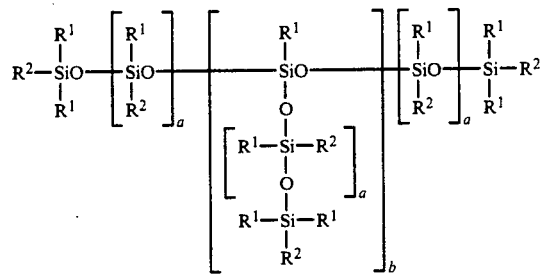

wherein
$R^1$ is the same or different in the molecule and represents an alkyl group with 1 to 4 carbon atoms, with the proviso that at least 90% of the $R^1$ groups are methyl groups,
$R_2$ is selected from
  a) an alkyl group with 1 to 20 carbon atoms, aryl group or aralkyl groups,
  b) an epoxy group which is linked by way of an Si-C bond to a silicon atom of the polysiloxane,
  c) a group of the formula $—R_3OH$, wherein $R_3$ is a divalent alkylene group with 3 to 11 carbon atoms
a has a value of 1 to 1,000 and
b has a value of 0 to 10,
with the proviso that in the average organopolysiloxane molecule, at least one $R_2$ group has the meaning b) and one the meaning c).

DESCRIPTION OF THE INVENTION

It is an essential characteristic of the inventive organopolysiloxanes that, aside from epoxy groups which are linked by way of Si—C bonds with silicon atoms of the polysiloxane, groups having the formula $—R_3OH$ must be present. These $—R_3OH$ groups are also linked to silicon atoms of the polysiloxane. The $—R_3OH$ groups intervene in the curing mechanism and affect the release properties and the adhesion to the substrate. Conventional photoinitiators, such as di-(dodecylphenyl)iodonium hexafluoroantimonate, can be dispersed or dissolved better in the inventive organopolysiloxanes having epoxy groups.

The significance of the groups and subscripts is explained in greater detail below.

$R^1$ can be the same or different within the average polysiloxane molecule, $R^1$ representing alkyl groups with 1 to 4 carbon atoms. At least 90% of the $R^1$ groups and preferably 100% of the $R^1$ groups are methyl groups.

The $R_2$ groups can represent alkyl groups with 1 to 20 carbon atoms, aryl groups or aralkyl groups. As alkyl groups, linear alkyl groups are preferred. Examples of suitable alkyl groups are the methyl, ethyl, propyl, butyl, hexyl, octyl, decyl and hexadecyl group. As an aryl group, the phenyl group is preferred and as aralkyl, the benzyl group By suitably selecting the alkyl groups, the release properties of the organopolysiloxanes having epoxy groups can be affected and adapted for the particular adhesive towards which they are to develop release properties As the number of carbon atoms of the $R_2$ groups increases, the compatibility of the organopolysiloxanes with organic adhesives improves and their release properties generally are reduced.

$R_2$ furthermore represents epoxy groups which are linked by way of Si—C bonds to silicon atoms of the polysiloxane. As examples of such epoxy groups, reference is made to the initially described epoxy groups. Particularly preferred epoxy groups are:

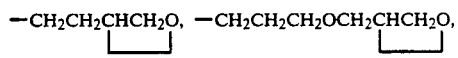

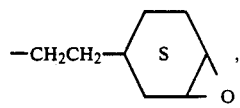

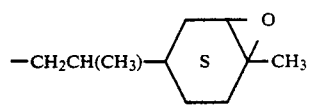

The $R_2$ groups can be selected also from a group of formula —$R_3OH$, wherein $R_3$ is a divalent alkylene group with 3 to 11 carbon atoms. Preferably $R_3$ is a divalent alkylene group with 3 to 6 carbon atoms. This arises from the accessibility of the groups.

In the average organopolysiloxane molecule of the invention, one $R_2$ must represent an epoxy group and at least one $R_2$ group must represent an —$R_3OH$ group.

Subscript a indicates the number of difunctional siloxy units and has a value of 1 to 1,000 and preferably 5 to 200.

The subscript b indicates the number of trifunctional siloxy units. It is thus a measure of branching and has a value of 0 to 10 and particularly of 0 to 2 in the average molecule. Since linear organosiloxanes are preferred, b particularly has a value of 0.

Organopolysiloxanes of the invention having epoxy groups are preferred which contain on the average 2 to 30 epoxy groups and 1 to 10 —$R_3OH$ groups. Particularly preferred are organopolysiloxanes with 2 to 10 epoxy groups and i to 5 —$R^3OH$ groups.

Examples of suitable curable organopolysiloxanes of the invention having epoxy groups are:

Compound 1

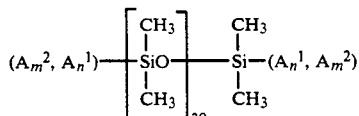

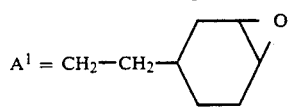

$A^2 = CH_2-CH_2-CH_2-OH$
n = 0.5
n = 0.5

Compound 2

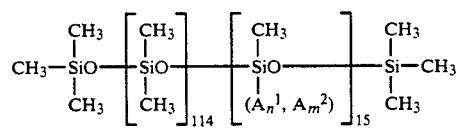

$A^1$ is as defined for compound 1
$A^2$ is as defined for compound 1
n = 0.5
m = 0.5

Compound 3

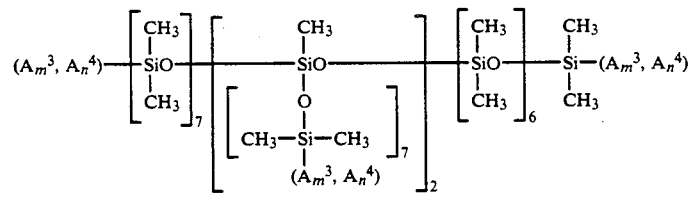

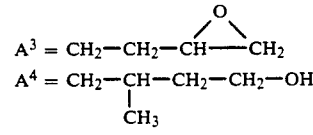
$A^4 = CH_2-CH-CH_2-CH_2-OH$
         $|$
         $CH_3$ n = 0.25
m = 0.75

Compound 4

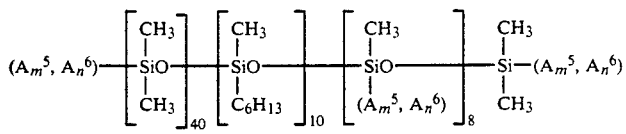

$A^5 = CH_2-CH_2-CH_2-O-CH_2-CH\overset{\displaystyle O}{\diagup\diagdown}CH_2$

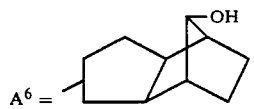

n = 0.15
m = 0.85

Compound 5

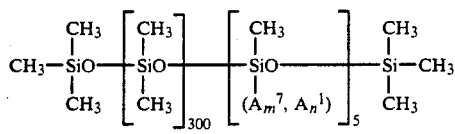

$A^1$ is as defined for compound 1
$A^7$ is $CH_2-CH_2-CH(OH)-CH_3$
n = 0.2
m = 0.8

In the most recent European patent application, EP-A-0 391 162 A2, a photopolymerizable preparation for coating is claimed, which contains, as component (A), an epoxy-functional diorganopolysiloxane of the general formula $R_2R'SiO(RR'SiO)_xSiR_2R'$ wherein
R is an alkyl group with 1 to 8 carbon atoms,
R' is R or a monovalent, epoxy-functional organic group with 2 to 20 carbon atoms, with the proviso that at least two R' groups are monovalent, epoxy-functional organic groups and
x has a value of 0 to 20.

Only those inventive compounds in which subscript b has a value of 0 are comparable with the compounds of this most recent European patent application. Even then, however, the inventive compounds are distinguished from the epoxy-functional siloxanes of the EP-A-0 391 162 A2, due to the condition that in the average molecule one $R_2$ group must be an $R_3$—OH group. This condition is essential, however, to achieve the aimed for properties.

A further object of the invention, which is a method for the synthesis of the inventive polysiloxanes containing epoxy groups, is achieved by reacting an organopolysiloxane with a compound of formula $R^5OH$, wherein $R^5$ is an alkylene group with a terminal olefinic double bond and contains 3 to 11 carbon atoms, in the presence of a catalyst and optionally in the presence of an inert solvent, at a temperature of 50° to 150° C. and in such a quantitative relationship that the epoxysiloxane has at least one —$R_3OH$ group in the average molecule, wherein the organopolysiloxane is of the formula

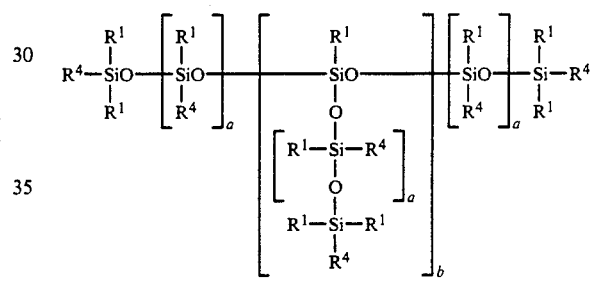

wherein
$R^1$ in the molecule is the same or different and represents an alkyl group with 1 to 4 carbon atoms, with the proviso that at least 90% of the $R^1$ groups are methyl groups,
R4 is selected from:
a) an alkyl group with 1 to 20 carbon atoms, aryl group or aralkyl group,
b) an epoxy group which is linked by way of Si—C bonds with silicon atoms of the polysiloxane and
c) a hydrogen atom,
a has a value of 1 to 1,000 and
b has a value of 0 to 1,
with the proviso that in the average molecule, at least one R4 has the meaning a) and at least one the meaning c).

The introduction of the —$R_3OH$ group accordingly is accomplished by an addition reaction between appropriate alcohols with a terminal olefinic double bond and an organopolysiloxane having epoxy groups and, additionally, SiH groups. This addition reaction is carried out in the presence of a hydrosilylation catalyst, particularly platinum catalysts such as $H_2PtCl_6$, $(NH_3)_2PtCl_2$ or platinum on charcoal. The reaction is optionally and preferably carried out in the presence of an inert solvent. An example of such an inert solvent is toluene or xylene. The conversion takes place at temperatures from 50° to 150° C.

A further method for synthesizing inventive polysiloxane is characterized in that an organopolysiloxane of the general average formula

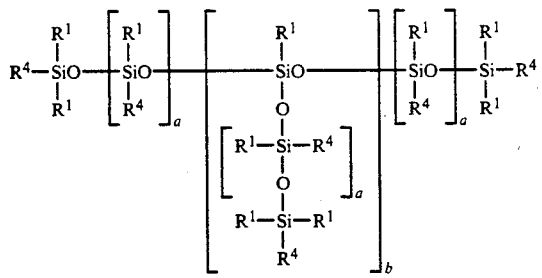

wherein
R$^1$ in the molecule is the same or different and represents an alkyl group with 1 to 4 carbon atoms, with the proviso that at least 90% of the R$^1$ groups are methyl groups,
R$_4$ is selected from:
a) an alkyl group with 1 to 20 carbon atoms, aryl group or aralkyl group,
b) a hydrogen atom,
a has a value of 1 to 1,000 and
b has a value of 0 to 1,
with the proviso that in the average organopolysiloxane molecule, at least two R$^4$ groups represent hydrogen atoms, is reacted with a mixture of epoxides which have terminal olefinic double bonds and compounds of the formula R$^5$OH, wherein R$^5$ is an alkylene group with a terminal olefinic double bond, which has 3 to 11 carbon atoms, in the presence of a catalyst and optionally in the presence of an inert solvent, at a temperature of 50° to 150° C. and in such quantitative ratio that the organopolysiloxane has at least one epoxy group and at least one —R$^3$OH group in the average molecule.

The reaction is carried out in the same manner as described above.

A further object of the invention is the method of using the organopolysiloxanes of the invention alone or in admixture with compounds having epoxy groups, particularly epoxypolysiloxanes which are free of —R$^3$OH groups, as curable coating materials with abhesive properties, as casting compositions, particularly for electrical and electronic purposes, and as coating materials for glass fibers.

The organopolysiloxanes of the invention can be used particularly as coatings which develop release properties towards pressure-sensitive adhesives of labels, decorative laminates, transfer papers and transfer tapes. They can, moreover, be used as nonadhering packing materials for foods and as industrial packing materials. In particular, paper sheets or films of polyethylene, polypropylene or polyester serve as support sheets for the abhesive coatings.

The inventive organopolysiloxanes can be used to advantage for the production of printing inks and decorative coatings.

A further preferred use for the organopolysiloxanes of the invention is the employment thereof alone or in admixture with other curable compounds as casting compositions. These casting compositions are employed particularly for electrical or electronic components, such as printed circuit board assemblies, switching devices, plugs, etc., which are exposed to the effects of aggressive media, moisture, etc.

The compounds of the invention and mixtures thereof can also be used to coat glass fibers which are intended, particularly, for the manufacture of beam waveguides. The coating protects the glass fibers against damage and damaging external influences and at the same time, affects the reflection of the glass fibers.

The curable modified organopolysiloxanes of the invention having epoxy groups can be used alone as curable coating materials, after the addition of conventional photoinitiators in an amount of 0.01% to 7% by weight, based on the organopolysiloxane. Optionally, these preparations can contain solvents, so that they can be applied better. However, solvent-free preparations are preferred. However, the organopolysiloxanes of the invention can be added also to conventional organopolysiloxanes which contain epoxy groups and represent the state of the art, in order to affect and modify their properties during the common curing reaction.

The inventive organopolysiloxanes can be mixed with reactive or nonreactive additives. Nonreactive additives are, for example, fillers or pigments, such as aerosil, titanium dioxide and barium sulfate.

Reactive additives are cationically curable compounds, which can be cured together with the inventive compounds and cross linked with these.

In the following examples, which further illustrate the best mode currently contemplated for carrying out the invention, the synthesis of curable modified organopolysiloxanes of the invention having epoxy groups is described initially. In the subsequent application-related comparison experiments, the properties of the inventive organopolysiloxanes are compared with those of the state of the art. The examples of the invention must not be construed as limiting the invention in any manner.

EXAMPLE 1

To a mixture of 496 g (4.0 moles) of vinylcyclohexene oxide, 154 g (2.6 moles) of allyl alcohol and 16 mg of H$_2$PtCl$_6$.6H$_2$O at 120° C., 1,942 g (1 mole) of a polydimethylsiloxane which contains SiH groups and has the average formula

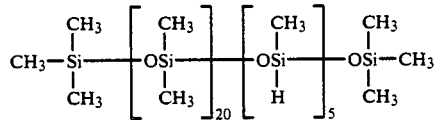

are added dropwise. At the end of the addition, stirring is continued for a further 6 hours at 130° C. After filtration and removal of the volatile reaction products at 120° C. and 0.1 mbar, 2,351 g (93% of the theoretical yield) of a moderately viscous oil are obtained, which, according to the IH-NMR spectrum, has the following general formula

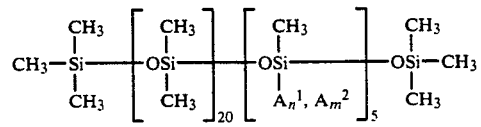

wherein
A$^1$ is as defined for compound 1
A$^2$ is as defined for compound 1 m=0.4.

EXAMPLE 2

As in Example 1, 376 g (3.3 moles) of allyl glycidyl ether, 191 g (3.3 moles) of allyl alcohol and 2,187 g of a polydimethylsiloxane containing SiH groups (see Example 1) are reacted to form a polydimethylsiloxane of the general formula

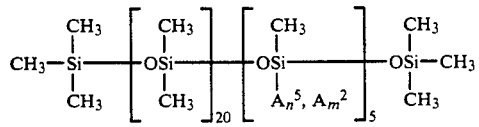

wherein
$A^2$ is as defined for compound 1
$A^5$ is as defined for compound 5
n 0.5 and m 0.5.

EXAMPLE 3

As in Example 1, 50.0 g (0.4 moles) of vinylcyclohexene oxide, 15.3 g (0.26 moles) of allyl alcohol and 1,159 g (0.1 moles) of a polydimethylsiloxane, which contains SiH groups and has the following general formula

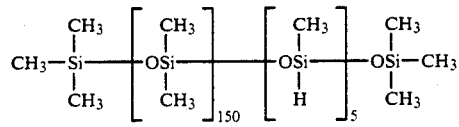

are reacted to form a polydimethylsiloxane of the following general formula

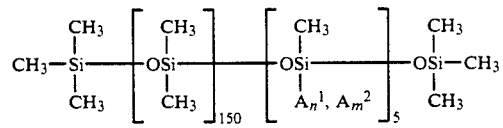

wherein
$A^1$ is as defined for compound 1
$A^2$ is as defined for compound 1
N=0.6
m=0.4.

EXAMPLE 4

As in Example i, 49 g (0.7 moles) of butadiene monoepoxide, 2.9 g (0.15 moles) of 3-methyl-3-butene-1-ol and 1,156 g (0.05 moles) of a polydimethylsiloxane, which contains Si-H groups and has the general formula

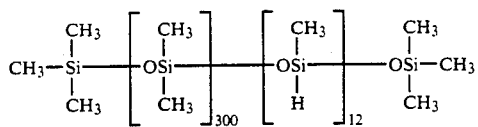

are reacted to form a polydimethylsiloxane of the general formula

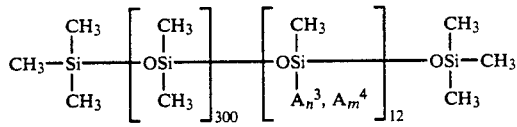

wherein
$A^3$ is as defined for compound 3
$A^4$ is as defined for compound 3
n 0.83
m 0.17.

EXAMPLE 5

As in Example 1, 136.4 g (1.1 moles) of vinylcyclohexene oxide, 95.7 g (1.1 moles) of 3-methyl-3-butene-1-ol and 1,538 g (1 mole) of a polydimethylsiloxane which contains SiH groups and has the average formula

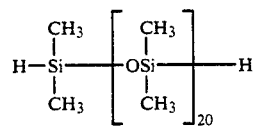

are reacted to form a polydimethylsiloxane of the general formula

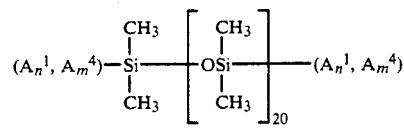

wherein
$A^1$ is as defined for compound 1
$A^4$ is as defined for compound 3
n=0.5
m=0.5.

EXAMPLE 6

As in Example 1, 231 g (3.3 moles) of butadiene monoepoxide, 95.7 g (1.1 moles) of a 3-methyl-3-butene-1-ol and 2,194 g (1 mole) of a polydimethylsiloxane, which contains SiH groups, are reacted to form a polydimethylsiloxane of the following average formula

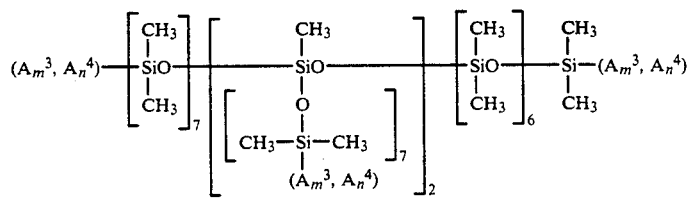

wherein
A³ is defined as for compound 3
A⁴ is defined as for compound 3
n=0.25
m=0.75.

EXAMPLE 7

As in Example 1, 115.9 g (0.9 moles) of vinylcyclohexene oxide, 24.8 g (0.17 moles) of 8(9)-hydroxytricyclo[5.2.1.0$^{2,6}$]-3decene and 494 g (0.1 moles) of a polysiloxane, the average formula of which is

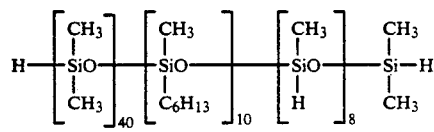

are reacted to form a siloxane of the general formula

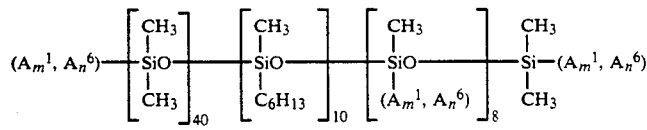

wherein
A¹ is defined as for compound 1
A⁶ is defined as for compound 4
n=0.15
m=0.85.

EXAMPLE 8

As in Example 1, 115.9 g (0.9 moles) of vinylcyclohexene 24.8 g (0.17 moles) of 8(9)-hydroxy-tricyclo[5.2.1.0$^{2,6}$]-3decene and 424 g (0.1 moles) of a polydimethylsiloxane, which contains Si-H groups, are reacted to form a polydimethylsiloxane having the average formula

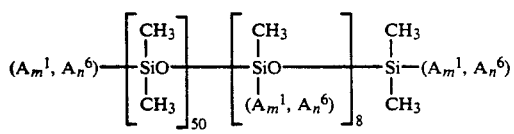

wherein
A¹ is defined as for compound 1
A⁶ is defined as for compound 4
n=0.15
m=0.85.

EXAMPLE 9

As in Example i, 68.2 g (0.55 moles) of vinylcyclohexene oxide, 55.4 g (0.77 moles) of methallyl alcohol and 2,308 g of a polydimethylsiloxane which contains Si-H groups are reacted to form a polydimethylsiloxane having the average formula

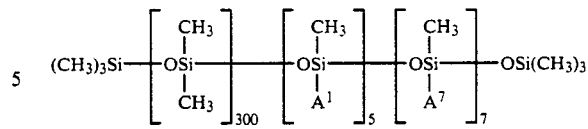

wherein:
A¹ is defined as for compound 1
A⁷ is defined as for compound 5.

EXAMPLE 10

As in Example 1, 68.2 g (0.55 moles) of vinylcyclohexene oxide, 55.4 g (0.77 moles) of methallyl alcohol and 2,798.2 g of a polydimethylsiloxane which contains Si-H groups are reacted to form a polydimethylsiloxane having the average formula

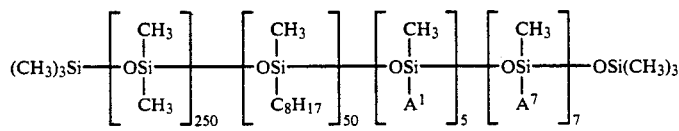

wherein:
A¹ is defined as for compound 1
A⁷ is defined as for compound 5.

EXPERIMENTAL EXAMPLES 1 to 3

Comparative Examples, not of the invention

As in Example 1, vinycylohexene oxide and polydimethyl-siloxanes, which contain Si-H groups, are reacted to form polydimethylsiloxanes of the following average formulas:

Experimental Example 1

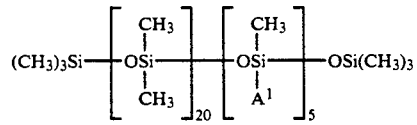

Experimental Example 2

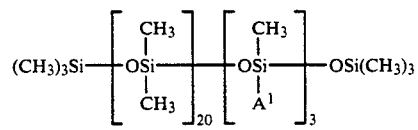

Experimental Example 3

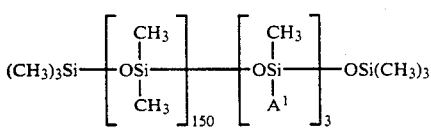

Application Tests of Compositions of the Invention and of Comparative Examples

To check the application properties of the polysiloxanes modified pursuant to the invention, compounds 1 to 10 are mixed with 1% by weight of bis(dodecylphenyl)iodonium hexafluoroantimonate, applied on an oriented polypropylene film and cured with a Fusion UV lamp (120 W/cm). The amount applied in each case is about 1.i g/cm². For the comparison examples, different 80 mm wide adhesive tapes are used, namely adhesive tapes coated with acrylate adhesives, which are obtainable commercially under the names Of Tesa ® 154 and Tesa ® 970, as well as an adhesive tape coated with a rubber adhesive, which is obtainable commercially under the name of Tesa ® 969.

To measure the abhesiveness, the adhesive tapes are rolled onto the substrate and stored subsequently, in the case of the acrylate adhesive tapes at 70° C. and in the case of the rubber adhesive tapes at 40° C. After 24 hours, the force is measured, which is required to pull the respective adhesive tape from the substrate at a peel angle of 180°. This force is referred to as the release force. In addition the adhesion of the modified polysiloxanes to the substrate is checked by rubbing vigorously with the thumb. Rubbery crumbs are formed if the adhesion is defective (so-called rub off test).

ant to the invention still cure readily despite a lower epoxy functionality. This is due to a synergism between the epoxy group and the $R_3$—OH group.

We claim:

1. A curable organopolysiloxane which contains at least one epoxy group and has the average formula

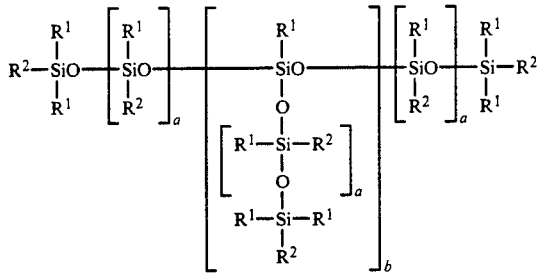

wherein
R¹ is the same or different in the molecule and represents an alkyl group with 1 to 4 carbon atoms, with the proviso that at least 90% of the R¹ groups are methyl groups,
R² is selected from
  a) an alkyl group with 1 to 20 carbon atoms, aryl group or aralkyl group,
  b) an epoxy group which is linked by way of an Si-C bond to a silicon atom of the polysiloxane, or
  c) a group of the formula —R³OH, wherein R³ is a divalent alkylene group with 3 to 11 carbon atoms
a has a value of 1 to 1,000 and
b has a value of 0 to 10, with the proviso that in the average organopolysiloxane molecule, at least one

TABLE

| | Modified Siloxane | | | | Oriented Polypropylene Film | | | | | | |
|---|---|---|---|---|---|---|---|---|---|---|---|
| | Chain Length | Epoxy Functionality | OH Functionality | Alkyl Group | Tesa(R) 154 | Tesa(R) 970 | Tesa(R) 969 | Solubility of Photo-initiator | Rub Off | Curing | Surface Oily/ greasy |
| | | | | | Release Force (N) | | | | | | |
| Example | | | | | | | | | | | |
| 1 | 27 | 3 | 2 | ./. | 2.1 | 2.5 | 2.6 | very good | no | yes | no |
| 2 | 27 | 2.5 | 2.5 | ./. | 2.4 | 2.7 | 2.8 | very good | no | yes | no |
| 3 | 157 | 3 | 2 | ./. | 0.3 | 0.38 | 0.35 | good | no | yes | no |
| 4 | 314 | 10 | 2 | ./. | 0.15 | 0.1 | 0.12 | moderate | no | yes | no |
| 5 | 21 | 1 | 1 | ./. | 2.0 | 2.3 | 2.2 | good | no | yes | no |
| 6 | ./. | 3 | 1 | ./. | 3.2 | 3.8 | 6.5 | good | no | yes | no |
| 7 | 59 | 6.8 | 1.2 | C₆H₁₃ | 2.1 | 2.4 | 2.2 | good | no | yes | no |
| 8 | 59 | 6.8 | 1.2 | ./. | 1.8 | 1.7 | 1.9 | good | no | yes | no |
| 9 | 314 | 5 | 7 | ./. | 0.05 | 0.08 | 0.07 | good | no | yes | no |
| 10 | 314 | 5 | 7 | C₈H₁₇ | 0.15 | 0.2 | 0.19 | good | no | yes | no |
| Experimental Example | | | | | | | | | | | |
| 1 | 27 | 5 | 0 | ./. | 1.9 | 2.2 | 2.2 | moderate | yes | yes | no |
| 2 | 25 | 3 | 0 | ./. | ./. | ./. | ./. | poor | ./. | no | yes |
| 3 | 155 | 3 | 0 | ./. | ./. | ./. | ./. | very poor | ./. | no | no |

It follows from the data in the Table that the organopolysiloxanes which have been modified pursuant to the invention have the desired application properties. They show good adhesion to the support, can be cured rapidly, show good abhesive properties towards adhesives of chemically different structures, in contrast to the organopolysiloxanes of the state of the art, can be adapted to the chemical character of the adhesive by choosing suitable substituents while keeping the siloxane framework the same and show good compatibility with photoinitiators. It is particularly striking that the organopolysiloxanes which have been modified pursu- R² groups has the meaning b) and one the meaning c).

2. The polysiloxane of claim 1, in which R³ is a divalent alkylene group with 3 to 6 carbon atoms.

3. The polysiloxane of claim 2, in which a has a value of 5 to 200 and b a value of 0 to 2.

4. The polysiloxane of claim 2 in which b has a value of 0.

5. The polysiloxane of claim 1, in which R¹ represents the methyl group.

6. The polysiloxane of claim 2, in which $R^1$ represents the methyl group.

7. A method for the synthesis of the polysiloxane of claim 1, comprising reacting an organopolysiloxane with a mixture of epoxides which have terminal olefinic bonds and a compound of the formula $R^5OH$, wherein $R^5$ is an alkylene group with a terminal olefinic double bond and contains 3 to 11 carbon atoms, in the presence of a catalyst capable of catalyzing the reaction between said organopolysiloxane and said mixture of epoxides and optionally in the presence of an inert solvent, at temperatures of 50° to 150° C. in such quantitative relationship, that the resultant epoxysiloxane has at least one $-R^3OH$ group in the average molecule, wherein the organopolysiloxane is of the average formula

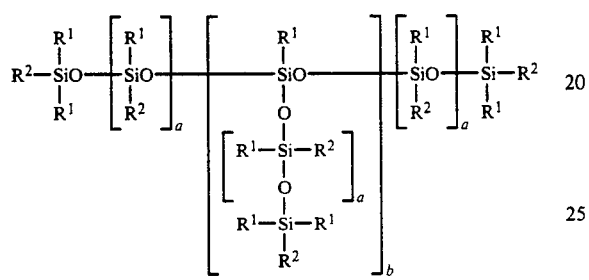

wherein
$R^1$ is the same or different in the molecule and represents an alkyl group with 1 to 4 carbon atoms, with the proviso that at least 90% of the $R^1$ groups are methyl groups,
$R^4$ is selected from
  a) an alkyl group with 1 to 20 carbon atoms, aryl group or aralkyl group,
  b) an epoxy group which is linked by way of an SiC bond to a silicon atom or the polysiloxane, or
  c) a hydrogen atom
a has a value of 1 to 1,000 and
b has a value of 0 to 10,
with the proviso that in the average organopolysiloxane molecule, at least one $R^4$ group has the meaning a) and at least one the meaning c).

8. A method for synthesizing the polysiloxane of claim 1, comprising reacting an organopolysiloxane with a mixture of epoxides which have terminal olefinic double bonds and compounds of the formula $R^5$ OH, wherein $R^5$ is an alkylene group with a terminal iolefinic double bond which has 3 to 11 carbon atoms, in the presence of a catalyst capable of catalyzing the reaction between said organopolysiloxane and said mixture of epoxides and optionally, in the presence of an inert solvent at temperatures of 50° to 150° C. and in such quantitative ratio that the resultant polysiloxane has at least one epoxy group and at least one $-R^3OH$ group in the average molecule, wherein the organopolysiloxane reactant is of the average formula

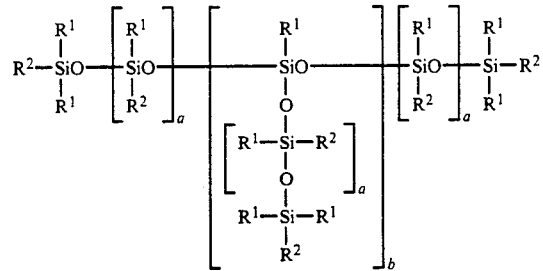

wherein
$R^1$ is the same or different in the molecule and represents an alkyl grou8p with 1 to 4 carbon atoms, with the proviso that at least 90% of the $R^1$ groups are methyl groups,
$R^4$ is selected from
  a) an alkyl group with 1 to 20 carbon atoms, aryl group or aralkyl group, or
  b) a hydrogen atom
a has a value of 1 to 1,000 and
b has a value of 0 to 10,
with the proviso that in the average organopolysiloxane molecule, at least two $R^4$ groups represent hydrogen atoms.

9. A method of preparing a substrate with a curable coating having abhesive properties comprising coating the substrate with an organopolysiloxane defined in claim 1.

10. A method of preparing a substrate with a curable coating having abhesive properties comprising coating the substrate with a mixture of an organopolysiloxane defined in claim 1 and another organopolysiloxane which has epoxy groups and which is free of $-R^3OH$ groups.

11. A casting composition comprising the organopolysiloxane defined in claim 1 in admixture with another organopolysiloxane which has epoxy groups and which is free of $-R^3OH$ groups.

12. A method of coating glass fibers comprising applying an organopolysiloxane defined in claim 1 to the glass fibers.

13. A method of coating glass fibers comprising applying a mixture of the organopolysiloxane defined in claim 1 and another organopolysiloxane which has epoxy groups and which is free of $-R^3OH$ groups to the glass fibers.

14. The method according to claims 7 or 8, wherein the catalyst is selected from the group consisting of $H_2PtCl_6$, $(NH_3)_2PtCl_2$ and Pt-carbon.

* * * * *